United States Patent
Cullen et al.

(10) Patent No.: US 9,865,982 B1
(45) Date of Patent: Jan. 9, 2018

(54) ENVIRONMENTALLY ROBUST AND COMPACT MODE-LOCKED LASER

(71) Applicant: Rockwell Collins, Inc., Cedar Rapids, IA (US)

(72) Inventors: Thomas J. Cullen, Ellicott City, MD (US); Mark A. Laliberte, Columbia, MD (US); Raymond Zanoni, Columbia, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 15/085,707

(22) Filed: Mar. 30, 2016

(51) Int. Cl.
| | |
|---|---|
| *H04B 10/06* | (2006.01) |
| *H01S 3/30* | (2006.01) |
| *H01S 3/098* | (2006.01) |
| *H01S 3/083* | (2006.01) |
| *H01S 3/067* | (2006.01) |
| *H01S 3/0941* | (2006.01) |
| *H01S 3/094* | (2006.01) |
| *H01S 3/11* | (2006.01) |
| *H01S 3/08* | (2006.01) |
| *H04B 10/275* | (2013.01) |
| *H04B 10/60* | (2013.01) |

(52) U.S. Cl.
CPC ...... *H01S 3/06791* (2013.01); *H01S 3/08027* (2013.01); *H01S 3/0941* (2013.01); *H01S 3/094003* (2013.01); *H01S 3/1106* (2013.01); *H04B 10/275* (2013.01); *H04B 10/60* (2013.01)

(58) Field of Classification Search
USPC .................................. 398/202; 372/6, 18, 94
See application file for complete search history.

(56) References Cited

U.S. PATENT DOCUMENTS

| | | | | |
|---|---|---|---|---|
| 5,212,711 | A * | 5/1993 | Harvey | H01S 3/06791 372/18 |
| 6,643,299 | B1 * | 11/2003 | Lin | H01S 3/131 372/18 |
| 6,845,108 | B1 * | 1/2005 | Liu | H01S 3/1109 372/20 |
| 7,573,918 | B1 * | 8/2009 | Soh | H01S 3/0812 372/100 |
| 2002/0044574 | A1 * | 4/2002 | Abedin | H01S 3/139 372/18 |
| 2002/0071454 | A1 * | 6/2002 | Lin | H01S 3/06791 372/6 |
| 2002/0176452 | A1 * | 11/2002 | Lin | H01S 3/067 372/18 |
| 2003/0133477 | A1 * | 7/2003 | Lin | H01S 3/106 372/6 |
| 2003/0174379 | A1 * | 9/2003 | Gupta | G02B 6/4215 359/278 |

(Continued)

*Primary Examiner* — David Payne
*Assistant Examiner* — Pranesh Barua
(74) *Attorney, Agent, or Firm* — Angel N. Gerdzhikov; Donna P. Suchy; Daniel M. Barbieri

(57) ABSTRACT

A mode-locked laser has optical components integrated into a single apparatus and interrelated via optical free-space coupling. The laser optical cavity path is reduced to less than ten meters, primarily composed of optical gain fiber. A Fabry-Perot filter is matched to the laser pulse repetition frequency. Utilizing a Fabry-Perot filter within the laser optical cavity suppresses supermode spurs in the phase noise spectrum; thereby reducing total timing jitter.

16 Claims, 4 Drawing Sheets

(56) References Cited

U.S. PATENT DOCUMENTS

| | | | | |
|---|---|---|---|---|
| 2005/0105865 | A1* | 5/2005 | Fermann | H01S 3/0057 385/122 |
| 2008/0179528 | A1* | 7/2008 | Demers | G01N 21/3581 250/341.1 |
| 2010/0215062 | A1* | 8/2010 | Chen | H01S 3/067 372/6 |
| 2010/0272131 | A1* | 10/2010 | Georges | H01S 3/0627 372/18 |
| 2012/0213531 | A1* | 8/2012 | Nazarathy | H03M 1/145 398/202 |
| 2012/0219026 | A1* | 8/2012 | Saracco | G02B 6/14 372/21 |
| 2013/0016004 | A1* | 1/2013 | Pierno | G01S 13/02 342/195 |
| 2013/0156051 | A1* | 6/2013 | Peccianti | H01S 3/06712 372/18 |
| 2015/0200518 | A1* | 7/2015 | Aguergaray | H01S 3/06712 372/6 |
| 2015/0207567 | A1* | 7/2015 | Bogoni | H04B 10/90 398/115 |
| 2015/0380892 | A1* | 12/2015 | Fermann | G01N 21/31 356/301 |

* cited by examiner

ENVIRONMENTALLY ROBUST AND COMPACT MODE-LOCKED LASER

BACKGROUND

Conventional mode-locked lasers utilize fiber pigtailed optical components spliced together to form the laser optical cavity. Optical fiber inter-connections between each optical component produce a laser optical cavity path length that can be 100 m or more. Such a long optical cavity produces an optical path length that is very sensitive to disturbances such as temperature change and vibration, adversely affecting the frequency stability of the laser output.

SUMMARY

In one aspect, embodiments of the inventive concepts disclosed herein are directed to a mode-locked laser having optical components integrated into a single apparatus. The laser optical cavity path is reduced to less than ten meters, primarily composed of optical gain fiber.

In a further aspect, a Fabry-Perot filter is matched to the laser pulse repetition frequency. Utilizing a Fabry-Perot filter within the laser optical cavity suppresses supermode spurs in the phase noise spectrum; thereby reducing total timing jitter.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
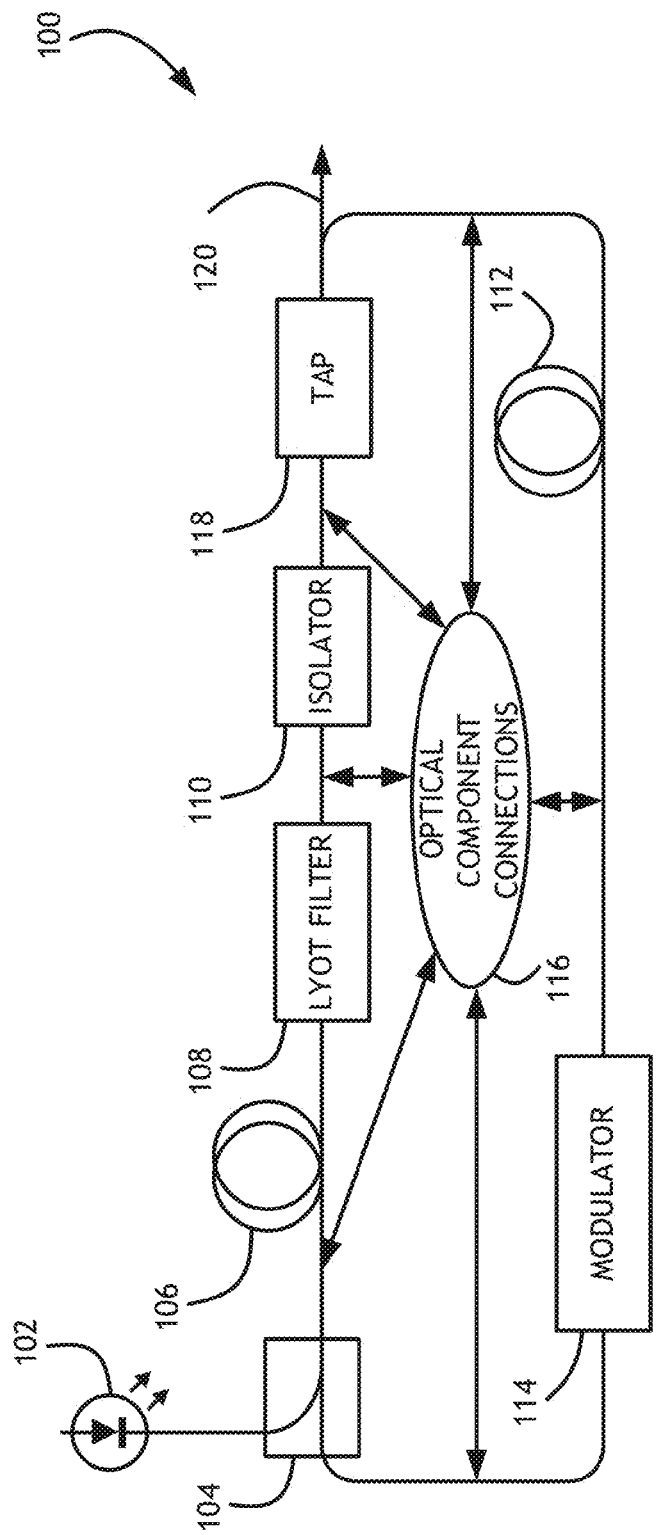
FIG. 1 shows a conventional, prior art, mode-locked laser.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a mode-locked laser having optical components integrated into a single apparatus.

Referring to FIG. 1, a conventional mode-locked laser 100 is shown. A conventional mode-locked laser 100 comprises a pump laser diode 102 that feeds light to a pump combiner 104. The conventional mode-locked laser 100 comprises one or more gain fiber elements 106, a Lyot filter 108, an isolator 110, one or more lead-zirconate-titanate (PZT) fiber elements 112, an electro-optic modulator 114, a laser tap 118, and a plurality of optical component connections 116 connecting the fiber-pigtailed optical components 104, 106, 108, 110, 112, 114, and 118 to produce a laser output 120 from the conventional mode-locked laser 100.

The pump combiner 104 combines light from the electro-optic modulator 114 and other optical components 106, 108, 110, 112, and 114 via the plurality of optical component connections 116. Each element in the plurality of optical component connections 116 adds to the optical cavity length. The optical cavity length must be stabilized to much less than 1 micron for lasers with short duration light pulses. Complex controls in the plurality of optical component connections 116 and the PZT fiber elements 112 (configured to stretch in response to temperature fluctuations) are required to stabilize the laser output 120.

Output stability is dependent, at least in part, on optical path length, which in turn is dependent on temperature changes based on thermos-optical index change and thermal expansion in the fiber material. A change in optical path length is correlated to a change in temperature multiplied by fiber length; therefore, a reduction in fiber length reduces temperature sensitivity.

Figure 2:
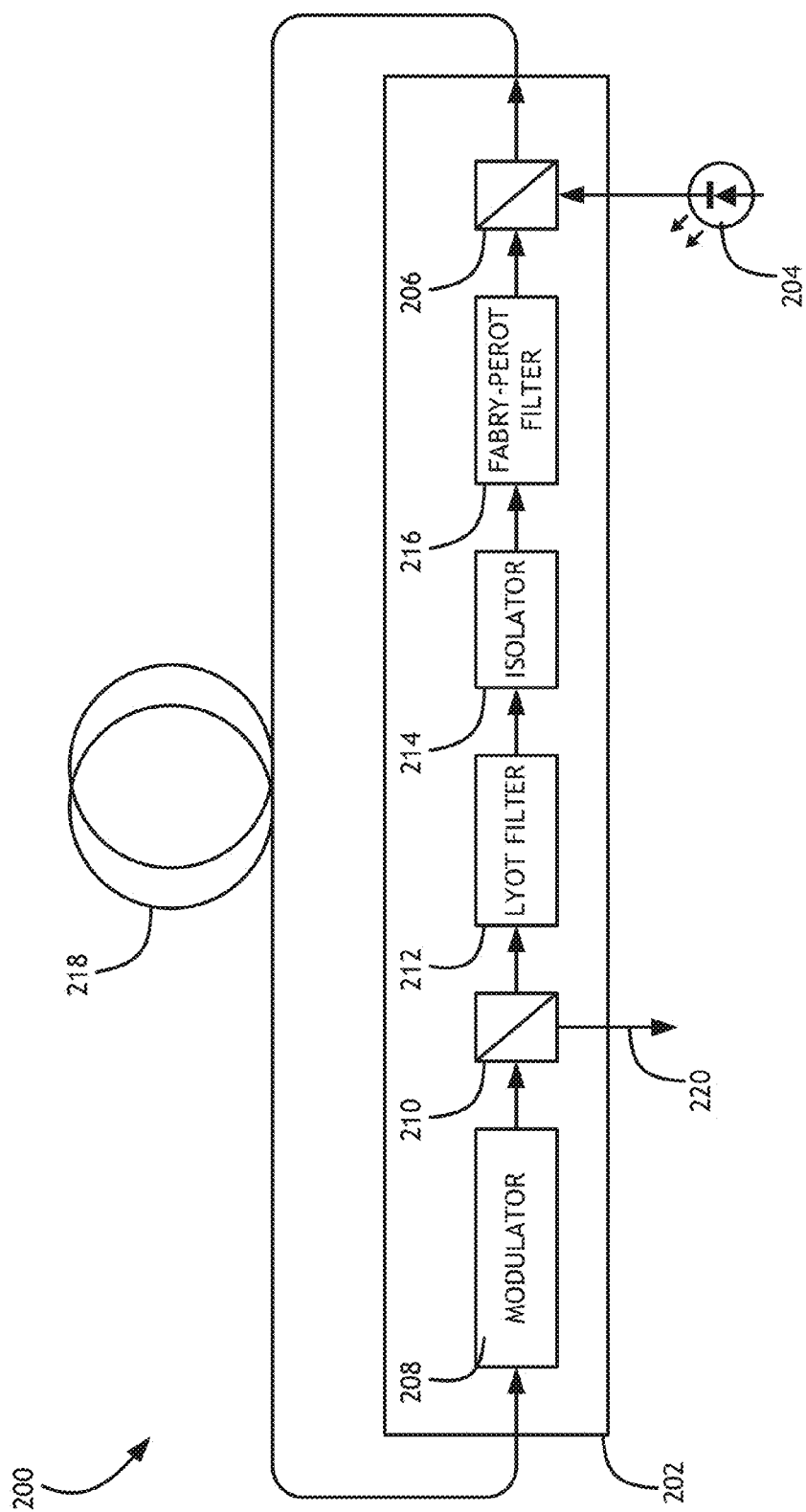
FIG. 2 shows an exemplary embodiment of a mode-locked laser according to the inventive concepts disclosed herein.

Referring to FIG. 2, an exemplary embodiment of a mode-locked laser 200 according to the inventive concepts disclosed herein is shown. The laser 200 comprises a compact enclosure 202 containing a modulator 208, output splitter 210, Lyot filter 212, isolator 214, and pump combiner 206. A pump laser diode 204 delivers light to the pump combiner 206 that combines the light with previous filtered laser pulses from the optical components 208, 210, 212, and 214 in the enclosure 202. The combined output from the pump combiner 206 is delivered as an input to the modulator 208 and the output splitter 210 produces a laser output 220. In some embodiments, the optical components 208, 210, 212, and 214 are affixed to the enclosure 202 along an optical pathway defined by an axis connecting the optical components 208, 210, 212, and 214, and optically coupled in free-space. Such embodiments obviate the need for fiber-pigtailed optical components and a plurality of optical component connections, resulting in an optical path length $1/100$ as long (or less) as compared to a conventional mode-locked laser such as shown in FIG. 1. A shorter optical path length requires less optical fiber in the optical cavity. Reducing the length of optical fiber in the optical cavity greatly reduces the effects of environmental disturbances on the stability of the output 220 of the laser 200 and reduces the complexity of any required active system stability controls.

For example, in a mode-locked laser 200 according to some embodiments utilizing optical fiber having a thermo-optical index coefficient of $6.8 \times 10^{-6}/°$ C. and a thermal expansion coefficient of $5.5 \times 10^{-7}/°$ C., a 25 m length of fiber would experience a change in length of 184 μm/° C. By comparison, 2.5 m length of fiber would experience a change in length of 18.4 μm/° C. Because of the reduced sensitivity to temperature, the enclosure 202 may be smaller than a convention mode-locked laser due to insulation requirements.

In some embodiments, one or more gain fiber elements 218 are interposed in the optical path between the pump combiner 206 and the modulator 208. Because of the shorter optical path length as compared to conventional mode-lock lasers, only gain fiber elements 218 are required in the laser cavity; no PZT fiber elements are necessary.

In some embodiments, the mode-locked laser 200 includes a Fabry-Perot filter 216 interposed between the isolator 214 and the pump combiner 206. The Fabry-Perot Filter 216 is also affixed to the enclosure 202 and optically coupled in free-space to the isolator 214 and pump combiner 206. The Fabry-Perot filter 216 reduces phase noise in the laser output 220.

Figure 3:
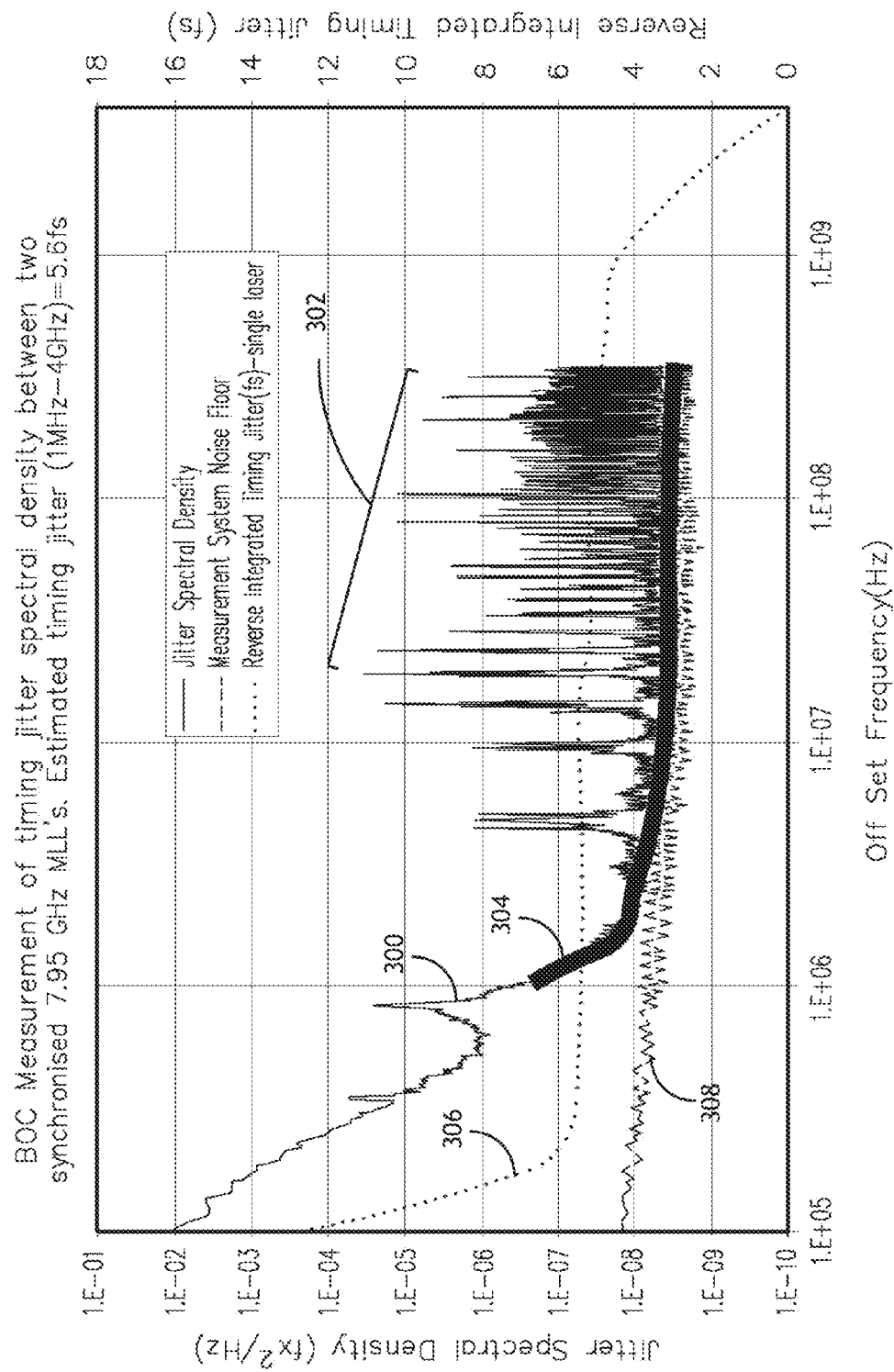
FIG. 3 shows a graph showing phase noise supermode spurs of conventional mode-locked lasers in a balanced optical correlator.

Referring to FIG. 3, a graph showing phase noise supermode spurs 302 of conventional mode-locked lasers in a balanced optical correlator is shown. Jitter spectral density 300 and reverse integrated timing jitter 306 are dependent on the offset frequency of mode-locked lasers in the balanced optical correlator. Within a particular offset frequency band, supermode spurs 302 develop. Within such range, it may be desirable to remove supermode spurs 302 such that the jitter spectral density approaches the single mode-locked laser phase noise floor 308 of approximately 168 dBc/Hz. A Fabry-Perot filter suppresses the supermode spurs 302 to produce an output within a target phase noise 304 approaching the single mode-locked laser phase noise floor 308. Accordingly, some embodiments are directed to a compact mode-locked laser with very low timing jitter that is insensitive to environmental disturbances.

Figure 4:
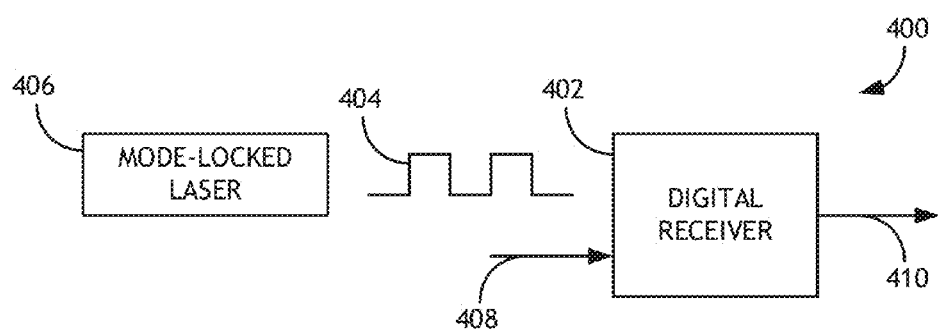
FIG. 4 shows a block diagram of a digital receiver system with an optical clock according to exemplary embodiments of the inventive concepts disclosed herein.

Referring to FIG. 4, a block diagram of a digital receiver system 400 with an optical clock according to exemplary embodiments of the inventive concepts disclosed herein is shown. A digital receiver system 400 includes a receiver 402 that receives a clock signal 404 comprising photo pulses produced by a mode-locked laser 406 according to one embodiment of the inventive concepts disclosed herein. The receiver 402 may receive the clock signal 404 via a photodiode or any other mechanism capable of distinguishing pulses in a frequency range corresponding to the operating frequency of the mode-locked laser 406. The receiver 402 also receives an input signal 408 and produces a digitized output 410 based on the input signal 408 and the clock signal 404. Such a digital receiver system 400 may be incorporated into a radar system or communication system such as a software defined radio.

Figure 5:
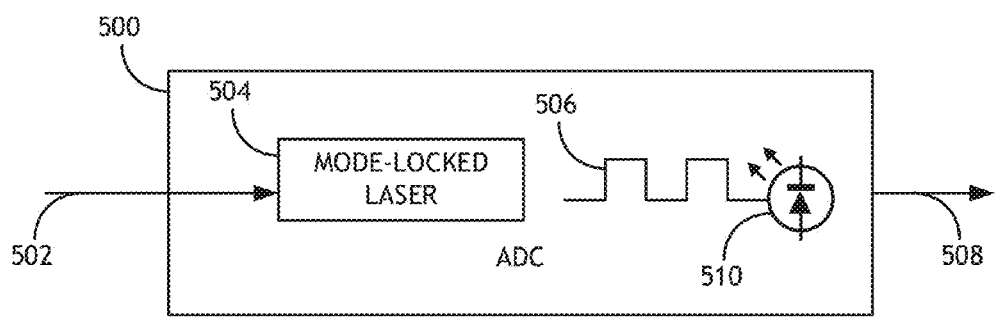
FIG. 5 shows a block diagram of a photonic analog-to-digital converter according to exemplary embodiments of the inventive concepts disclosed herein.

Referring to FIG. 5, a block diagram of a photonic analog-to-digital converter 500 according to exemplary embodiments of the inventive concepts disclosed herein is shown. A photonic analog-to-digital converter 500 receives an analog signal 502. The analog signal 502 may drive a pump laser diode in a mode-locked laser 504 according to embodiments of the inventive concepts disclosed herein, or otherwise indirectly drive pulses in the mode-locked laser 504, which then produces a corresponding stream of photo pulses that may be converted to a digital signal output 508 via some mechanism such as a photodiode 510.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages. The form herein before described being merely an explanatory embodiment thereof, it is the intention of the following claims to encompass and include such changes.

What is claimed is:
1. A mode-locked laser apparatus, comprising:
a pump laser diode;
a pump combiner in optical communication with the pump laser diode;
an output splitter;
a modulator in optical communication with the output splitter, via free-space coupling, and the pump combiner;
an isolator disposed in an optical pathway defined by an axis from the modulator to the pump combiner; and
a Lyot filter disposed between the output splitter and the isolator, within the optical pathway, in optical communication with the output splitter and the isolator, via free-space coupling,
wherein the pump combiner, output splitter, modulator, and isolator are fixed in a relative position within an enclosure, along the optical pathway with at least two of the pump combiner, output splitter, modulator, and isolator being in optical communication via free-space coupling.

2. The mode-locked laser of claim 1, further comprising a Fabry-Perot filter disposed between the isolator and the pump combiner, within the optical pathway, in optical communication with the isolator and the pump combiner.

3. The mode-locked laser of claim 1, wherein the pump combiner is in optical communication with the modulator via a length of optical fiber.

4. The mode-locked laser of claim 3, wherein the length of optical fiber comprises one or more gain fiber elements.

5. The mode-locked laser of claim 4, wherein the length of optical fiber is shorter than 10 m.

6. A digital receiver comprising:
   a mode-locked laser configured to output a clock signal, the mode-locked laser comprising:
      a pump laser diode;
      a pump combiner in optical communication with the pump laser diode;
      an output splitter;
      a modulator in optical communication with the output splitter, via free-space coupling, and the pump combiner;
      an isolator disposed in an optical pathway defined by an axis from the modulator to the pump combiner; and
      a Lyot filter disposed between the output splitter and the isolator, within the optical pathway, in optical communication with the output splitter and the isolator, via free-space coupling,
      wherein the pump combiner, output splitter, modulator, and isolator are fixed in a relative position within an enclosure, along the optical pathway with at least two of the pump combiner, output splitter, modulator, and isolator being in optical communication via free-space coupling; and
   a receiver configured to:
      receive the clock signal from the mode-locked laser; and
      produce a digitized signal.

7. The digital receiver of claim 6, wherein the mode-locked laser clock further comprises a Fabry-Perot filter disposed between the isolator and the pump combiner, within the optical pathway, in optical communication with the isolator and the pump combiner.

8. The digital receiver of claim 6, wherein the pump combiner is in optical communication with the modulator via a length of optical fiber.

9. The digital receiver of claim 8, wherein the length of optical fiber comprises one or more gain fiber elements.

10. The digital receiver of claim 9, wherein the length of optical fiber is shorter than 10 m.

11. An analog-to-digital converter comprising:
    a mode-locked laser comprising:
       a pump laser diode;
       a pump combiner in optical communication with the pump laser diode;
       an output splitter;
       a modulator in optical communication with the output splitter, via free-space coupling, and the pump combiner;
       a Lyot filter disposed between the output splitter and the isolator, within the optical pathway, in optical communication with the output splitter via free space coupling; and
       an isolator in optical communication with the Lyot filter via free-space coupling,
    wherein:
       the pump combiner, output splitter, modulator, and isolator are fixed in a relative position within an enclosure, along an optical pathway defined by an axis from the modulator to the pump combiner with at least two of the pump combiner, output splitter, modulator, and isolator being in optical communication via free-space coupling; and
       the pump laser diode is configured to receive an analog signal.

12. The analog-to-digital converter of claim 11, further comprising a photodiode configured to receive optical pulses from the output splitter and produce a digitized signal.

13. The analog-to-digital converter of claim 11, wherein the mode-locked laser further comprises a Fabry-Perot filter disposed between the isolator and the pump combiner, within the optical pathway, in optical communication with the isolator and the pump combiner.

14. The analog-to-digital converter of claim 11, wherein the pump combiner is in optical communication with the modulator via a length of optical fiber.

15. The analog-to-digital converter of claim 14, wherein the length of optical fiber comprises one or more gain fiber elements.

16. The analog-to-digital converter of claim 15, wherein the length of optical fiber is shorter than 10 m.

* * * * *